Figure 1:
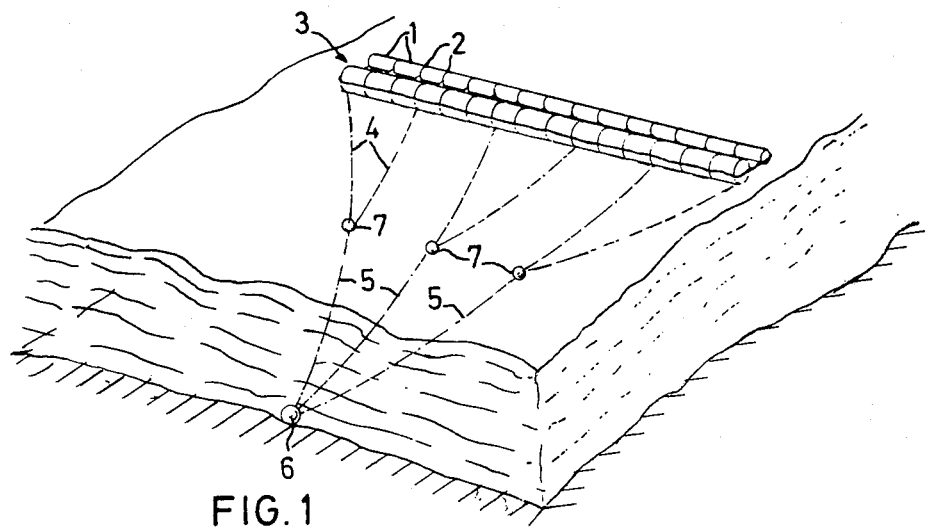

United States Patent [19]

Törnkvist

[11] 4,258,270
[45] Mar. 24, 1981

[54] MARINE WAVE POWER PLANT

[75] Inventor: Rolf E. A. Törnkvist, Helsinki, Finland

[73] Assignee: Salén Energy AB, Stockholm, Sweden

[21] Appl. No.: 65,154

[22] Filed: Aug. 9, 1979

[30] Foreign Application Priority Data

Aug. 22, 1978 [SE] Sweden ............................... 7808856

[51] Int. Cl.³ ............................................. F03B 13/12
[52] U.S. Cl. ...................................... 290/53; 60/499; 417/331
[58] Field of Search .................................. 290/42, 53; 417/330–333; 60/495–507

[56] References Cited

U.S. PATENT DOCUMENTS

| | | | |
|---|---|---|---|
| 1,746,613 | 2/1930 | Shuler | 60/499 |
| 3,151,564 | 8/1964 | Rosenberg | 60/499 |
| 3,631,670 | 1/1972 | Vassilakis | 60/499 |
| 3,758,788 | 9/1973 | Richeson | 290/53 X |
| 4,036,563 | 7/1977 | Tornkvist | 417/331 |

*Primary Examiner*—B. Dobeck
*Assistant Examiner*—W. E. Duncanson, Jr.
*Attorney, Agent, or Firm*—Young & Thompson

[57] ABSTRACT

A marine wave power plant includes interconnected, swingable, floating basic units with anchoring means. Each unit consists of bearing displacement tubes, a stationary member and a displacement body movably joined thereto and moving with the waves. The wave movements are converted to electrical energy via a hydraulic-electrical system. The rear surface of the movable member is curved with its center of curvature at the journalling axis on the stationary member to avoid pumping between the two members, while a journalling arm is length-adjustable for different wave characteristics. To control the various parameters dependent on incoming waves, a sensor measures the water level in front of the displacement body. The movements of this body, the radian volume of the hydraulic motor and the electrical power output is controlled via a process computer.

9 Claims, 6 Drawing Figures

MARINE WAVE POWER PLANT

Among the clean and non-depletable energy sources, ocean waves are one of the most abundant and valuable. The power generated can be fed into general distribution networks or can be used for production in direct connection to a marine wave power generator.

Half of the energy in marine waves moves forward with the roll of the waves and this potential energy component can be exploited in a wave power plant, while the other half, the kinetic energy in the masses of water, maintains the oscillation without transporting energy in the direction of the wave.

Various devices have been suggested over the years for extracting energy from waves by exploiting the lifting force of the waves to cause floating bodies or the like to move continuously up and down, or by exploiting the forward driving force of the waves to cause paddles or the like to move continuously in an endless path, or by exploiting the pressure of the waves to cause elastic cushions to alternatingly be compressed and expand.

The fact that the energy content of marine waves is of low energy per mass/unit, which by virtue of the large masses of water participating in the movement, however, can add up to a considerable flow of energy through every vertical plane in the path of the advancing waves, has not been utilized for the production of energy in previous proposals. Nor has the energy extraction been based on systematically opposing the motion of the water particles within a continuous mass of water with forces which extract the hydrodynamic energy within the entire amount of water. Since the fact that the water transport in deep sea waves is insignificant and only affects the wave energy to a small extent has not been headed previously, the natural resources which wave energy constitutes has first been able to be rationally exploited with the present invention.

According to the invention, in principle, large, vertical plates or shields, attenuators, which float primarily under the surface, are oriented perpendicular to the direction of the waves and more or less parallel with the main wave front. The attenuators are kept in place by anchoring them with sufficient elasticity so that they will not break loose under abnormal stresses. Pivoting members, called swing members below, cooperate with the attenuators. The movement of the swing members acts on hydraulic cylinders to generate electricity via a hydraulic motor.

To prevent a pumping effect on the water between the swing member and the attenuator, the rear surface of the swing member is made curved, preferably cylindrical, with the cylindrical center at the journalling point of the swing member. When there are waves appreciably larger than normal, the ability of the swing member to move and push aside water while maintaining the cylindrical center at the journalling point of the swing member can be insufficient to effectively exploit the wave energy. To compensate for this, the swing member is suitably journalled to the fixed journal on the attenuator with a rigid linking arm, and with a length-adjustable linking arm, whereby the center of curvature can be made to deviate from the journalling point. It is true that this will give rise to a pumping effect in the water between the swing member and the attenuator, but this is insignificant when compared to the advantages of effectively exploiting the energy of large waves. The mechanical energy in the relative movement between the swing member and the attenuator is converted into pressure in the hydraulic cylinders. The oil therefrom drives a hydraulic motor, the radian volume of which is controlled by a servo valve and a switch. The term "radian volume" is used in the present description to designate the amount of oil which passes through a hydraulic motor during the period when the motor shaft makes an angular rotation of 1 radian.

Thus at a certain average wave size, that is to say a certain average influx of energy, it is possible to hold the rotational speed of the hydraulic motor substantially constant. The hydraulic motor drives in turn an electrical generator, provided with a flywheel.

In order to be able to use the wave energy effectively it is important that the swing member move in the correct manner in relation to each incoming wave. Even at a certain average size, the individual waves vary appreciably so that the swing member can get out of phase and reduce the power yield. To avoid this, a sensor can be placed in front of the swing member to continuously measure the height of the water surface and send signals to a computer. On the basis of the signals, the computer can calculate the shape of the wave and compare the actual movement of the swing member with the ideal movement dictated by the wave. From these values the computer can control the hydraulic system to get the extra energy from the generator flywheel to momentarily accelerate or retard the swing member. In this way the movement of the swing member can be substantially adapted to each individual wave.

Figure 2:
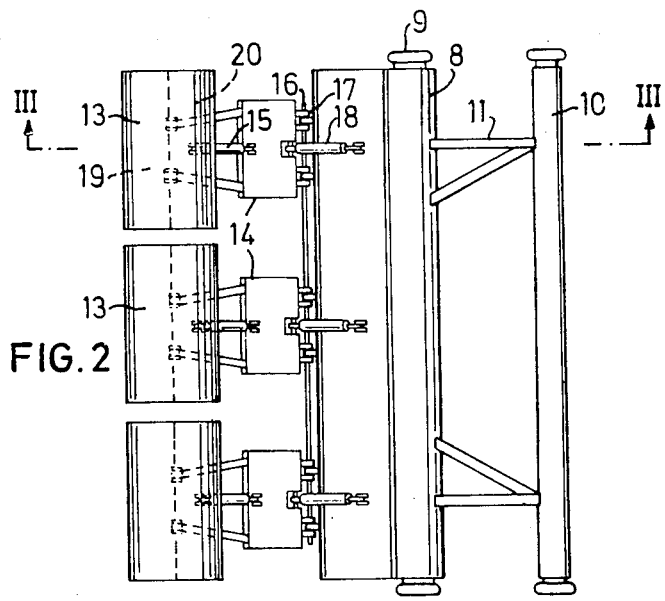
Figure 3:
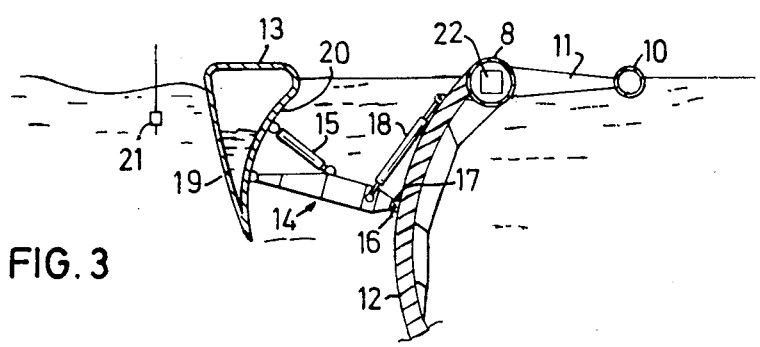

A preferred embodiment of a wave power plant according to the invention is described below in more detail in connection with the accompanying drawings, which show in FIG. 1 a schematic wave power plant with anchoring means, FIG. 2 a basic unit in the wave power plant as seen from above, FIG. 3 a section through FIG. 2 along the line III—III, FIG. 4 a block diagram for control, FIG. 5 a connection between two basic units, and FIG. 6 a modified embodiment according to the invention.

FIG. 1 shows how a number of basic units 1 are united by means of elastic couplings 2 to form the energy converter in the form of a long beam 3, which is anchored to the sea floor with an anchor 6 or the like via anchor lines 4,5. In order to achieve a certain elasticity in the anchoring arrangement so that it gives way when there are momentary large stresses, the lines 4,5 are suitably provided with buoys 7.

Each basic unit consists of a tubular member 8 with large displacement, which extends over the entire breadth of the basic unit and which is provided at its ends with couplings 9 for joining it to adjacent basic units. A smaller displacement tube 10 is rigidly joined to the tube 8 by means of spacer bars 11 and is likewise provided with couplings 9 at the ends for coupling together with adjacent basic units. Forward and downwards from the tube 8, a shield or plate 12 extends, which also stretches over the entire breadth of the unit and serves as a damper or attenuator for the wave movement. In order to achieve a high degree of efficiency, it is important that this plate 12 move as little as possible, i.e. that the wave after the energy converter 3 has as little energy content as possible. The plate 12, the attenuator, should therefore have a large surface and extend deep down into the water so that large masses of water participate and brake its movement. The plate 12 is suitably made curved for design considerations to provide high strength and rigidity with minimal use of materials.

In front of the attenuator 12, a pivoting or swinging member 13 is arranged which is journalled via rigid links 14 and hydraulically adjustable links 15 to a shaft 16 set in brackets 17 on the front side of the attenuator 12. Due to the fact that the rigid links 14 are directed obliquely inward towards the middle of the swing member, it is prevented from being displaced along the wave front, and the swing member can be turned somewhat as well, something which is valuable when it is not entirely parallel to the wave front. Via a pump cylinder 18, the swing member 13 is also attached to the front side of the attenuator 12, so that the swinging movements produce a pumping effect which can be converted to electrical energy, for example, with hydraulic motors and electrical generators suitably disposed inside the tube 8. The swing member 13 is suitably made shorter than the attenuator 12 so that, for example, three swing members lie in a row in front of the attenuator in each basic unit. The swing member 13 is suitably wedge-shaped with a front surface 19 and a rear surface 20 and ballasted with water inside. The rear surface 20 is cylindrically curved with its center at the journalling shaft 16 when the links 15 are in their normal position. The surface 20 exerts in this way no pumping effect within the converter. Changing the setting of the links 15 compensates for deviating wave sizes.

The front surface 19 is formed so that in the controlled movement for a general wave type, water is displaced in a manner similar to that of a sheet or film immersed in the water as the wave movement but no water flow passes through.

Figure 4:
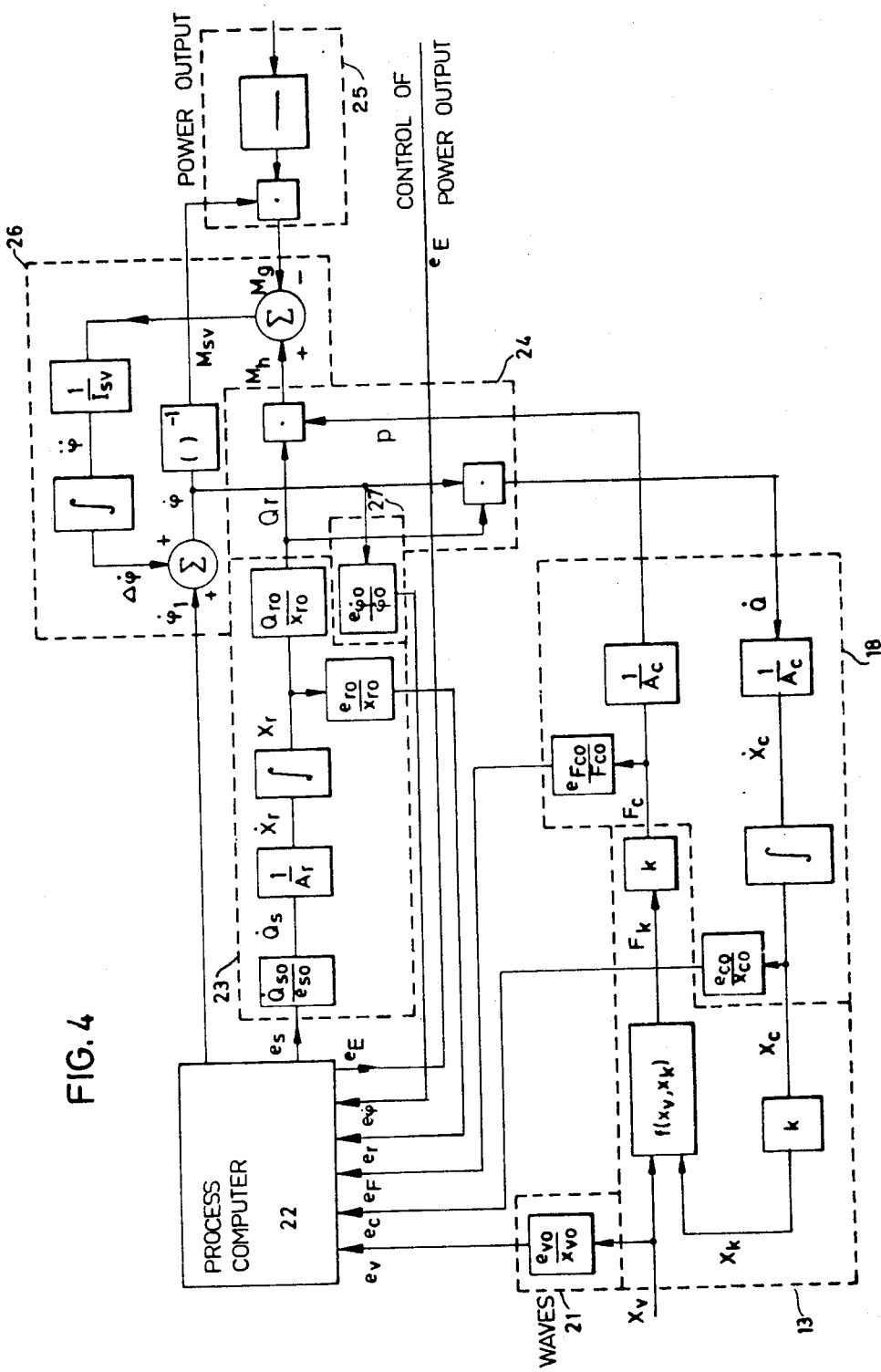

The movement of the swing member is controlled as shown in the block diagram in FIG. 4.

From a sensor 21 in front of the swing member 13, impulses $e_v$ are fed to a computer 22, which calculates the wave characteristic and gives off a signal $e_s$ to the electrohydraulic servo valve in the motor setter 23 for the hydraulic motor 24. This generates two streams of oil $\dot{Q}_s$ with velocity $\dot{Q}_s$ which displace the pistons in the cylinders of the motor setter with the velocity $$\dot{Q}_s/A_r = \dot{x}_r$$

where $A_r$ designates the piston area of the motor setter. The signal $e_s$ is first multiplied by a transfer quotient $$\dot{Q}_{so}/e_{so}$$

the maximum flow of the servo valve divided by the maximum value of the signal.

Integration of the piston velocity over time yields the piston position $x_r$ which is returned to the computer 22 as the signal $e_r$ after multiplication by the transfer quotient $$e_{ro}/x_{ro}$$

the maximum value of the signal $e_r$ divided by the maximum position of the piston.

Multiplying $x_r$ by $$Q_{ro}/x_{ro}$$

the maximum value of the signal $e_r$ divided by the maximum position of the piston yields the instantaneous radian volume $Q_r$ of the hydraulic motor 24. The moment $M_h$ of the hydraulic motor is equal to the product of the instantaneous radian volume $Q_r$ and the oil pressure p. The hydraulic motor drives the electrical generator 25 from which a power $P_{el}$ is taken. The ingoing mechanical power $P_{mek}$ to the generator is divided by the instantaneous rotational speed $\dot{\phi}$ and subraction of the generator moment $M_g$ thus obtained, from the moment $M_h$ of the hydraulic motor yields the moment $M_{sv}$ which acts on the flywheel 26.

Dividing $M_{sv}$ by the polar moment of inertia $I_{sv}$ of the flywheel gives the time derivative of the angular velocity, the angular acceleration $\ddot{\phi}$, and integrating it over time yields the deviation $\Delta\dot{\phi}$ from the set normal rotational velocity $\dot{\phi}_1$. The addition of $\Delta\dot{\phi}$ and $\dot{\phi}_1$ gives the actual rotational velocity which is used on the one hand to obtain the generator moment, and on the other hand is multiplied by $Q_r$ to produce $\dot{Q}$, which is the volume flow through the system.

A feedback signal $e\dot{\phi}$ is transferred to the computer via a tachometer 27.

From the piston area $A_c$ of the pump cylinder 18 and the oil flow $\dot{Q}$ through the system, the piston speed $\dot{x}_c$ in the cylinder 18 is computed, and integration of $\dot{x}_c$ yields the piston position $x_c$, which is fed back to the computer as signal $e_c$.

$x_c$ is further multiplied by the ratio k between the lengths of the oscillation radius 14,15 of the swing member 13 and the oscillation radius of the pump cylinder 10 to give the corresponding movement $x_k$ of the swing member 13.

The movement of the incoming waves $x_v$ generates in the sensor 21 the signal $e_v$ to the computer, and from $x_v$ and $x_k$ the force $F_k$ on the swing member is also computed. $F_k$ is multiplied by the ratio k to give the force $F_c$ on the cylinder, and $F_c$ is multiplied by the reference value for the cylinder force $$e_{Fco}/F_{co}$$

to give the signal $e_F$ to the computer. Dividing the force $F_c$ by the piston area $A_c$ yields the pressure p which, as was mentioned above, when multiplied by $Q_r$ yields $M_h$.

In addition to the signal $e_s$, the computer also sends out the signal $e_E$ for regulating the electrical output.

For the sake of clarity, in the description of the control process we have not taken into account the losses in the system, and thus only the principle of the process has been illuminated.

The energy flow of the waves is pulsating within wide limits, and the significant periodicity is long, from 1–2 seconds up to 10–20 seconds. A flywheel is thus necessary for the system to function. In general, the average energy content of the waves is constant for a fairly long time, several hours; but changes occur over time. Therefore, when the waves change their character, the normal value for the rotational speed $\dot{\phi}$ is adjusted by automatic control of the variation range for $Q_r$. This is done by the computer computing $e_s$ in different ways.

Furthermore, the output of electrical power can vary, and if it is too great or too little, the rotational speed is affected thereby. Therefore, the computer gives off control impulses $e_E$ which regulate the output of electrical power.

The controlled power transmission is based on the fact that the piston movement of the pump cylinder 18 is practically solely dependent on the radian volume of the rotating hydraulic motor times the angular velocity, but is independent of the load, i.e. the hydraulic pressure; and on the fact that energy is accumulated in and given off from the flywheel connected to the electrical generator and the hydraulic motor and which keeps the degrees of irregularity within permissible limits. The effect is thus in principle the same as for the flywheel in an ordinary four-stroke combustion engine. The cylinder or cylinders 18 are double-acting and give and take the same amount of oil in the unloaded state and in all the piston positions. The cylinder is coupled with hoses and pipes to the hydraulic motor, and the radian volume of the hydraulic motor is controlled by means of an electrohydraulic servo valve and a hydraulic motor switch. A number of swing members can be connected to the same generator, e.g. four cylinders with hydraulic motors from swing members in the same basic unit.

By controlling the swing member, the incoming waves can move undisturbed up to the front surface of the swinger, whereupon they are converted in the described manner into mechanical energy which via pump cylinders 18, hydraulic motors 24 and electric generators 25 and flywheels 26 is converted to and made usable as electrical energy.

For a trochoid wave the reciprocally oscillating amount of water per meter of wave width is $Q = \lambda H/2\pi$, which for $\lambda = 25$ m and $H = 2$ m yields
$Q = 7.96$ m$^3$/m.

Since the depth effect of the swing member is limited, one can use the volume of water $Q_1 \approx Q/2$.

In this case the swing member as it goes down displaces about 4 m$^3$/m when the water in the wave trough pulls back and makes room for the same volume of water when the wave crest pushes on it.

For smaller waves the oscillation amplitude is reduced but for waves appreciably greater than the normal wave, the amplitude with the normal length of the link 15 is not sufficient. But by hydraulic adjustment for example, it is possible to increase $Q_1$ so that the converter can absorb more energy.

The wave power plant is anchored at a distance from the coast, between a few kilometers to several tens of kilometers, with a bottom depth which should not be too shallow and which can be as much as 100–300 m or more. The anchor lines must be strongly anchored to the bottom and permit turning around the anchoring point so that the wave converter can be oriented against the wave direction at the time. From the anchor itself, a few lines or bunches of lines 5 lead to branching points 7, from which a larger number of lines 4, for example one line for every three or four basic units, lead to the wave power plant. The lengths of the lines can be adjusted so that their curving effect on the converter is minimized. Buoys are fixed to the branching points 7 so that, when the lines are stretched under the tensile forces from the converter, they sink under the surface and provide the required elasticity to absorb the heavy sea forces.

To orient the wave power generator perpendicular to the prevailing wave direction, it can be provided with one or more steering propellers.

The forces from the anchor lines and thus the stresses on the beam 3 made up of basic units are significant when there are heavy seas, since the beam is subjected to large horizontal moments. The ultimate bearing resistance of the displacement tubes, especially tube 8, and the weight of the attenuator normally prevent the beam from breaking either up or down, but where the risk of breakage is great, a third coupling can be mounted between the two other couplings between 8—8 and 10—10 and under the same. It is necessary to make the couplings between the basic units elastic, and for this purpose one can use steel springs, hydraulic springs or pneumatic springs. Hydraulic springs are much more advantageous with regard to weight and space requirements than steel springs but they require many guide bearings and protection against corrosion in seawater. Therefore, we have found it most advantageous to connect the basic units via pneumatic couplings.

Figure 5:
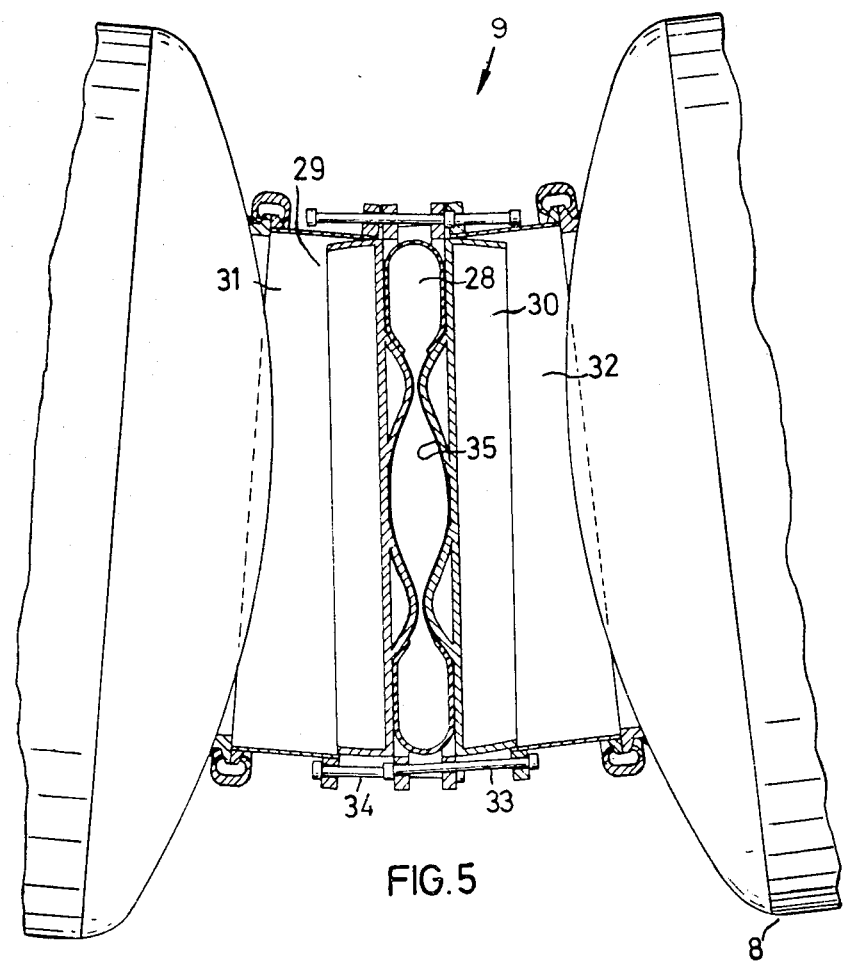

FIG. 5 shows such a coupling using a specially constructed and reinforced ring of rubber 28, a car tire of suitable size for example, or of another strong and elastic material. The ring is mounted air-tight between two discs 29 and 30, and two steel rings 31,32 are slipped onto individual flanges on the discs 29 and 30. A system of set bolts or wire straps 33 couples the disc 29 to the ring 32 and an identical system 34 holds the disc 30 and the ring 31 together. The rings 31 and 32 are fixed to individual basic units.

When the coupling is subjected to pressure or tension the discs are pressed against each other and the initial pressure inside the rubber ring increases. Likewise, the coupling can provide resilient resistance to oblique pressure and tensile forces as shown in FIG. 5. A coupling of this type can also absorb torsion torque to a certain extent. As a safety feature against puncture, the pressure chamber can also be provided with an enclosed rubber bladder 35.

Figure 6:
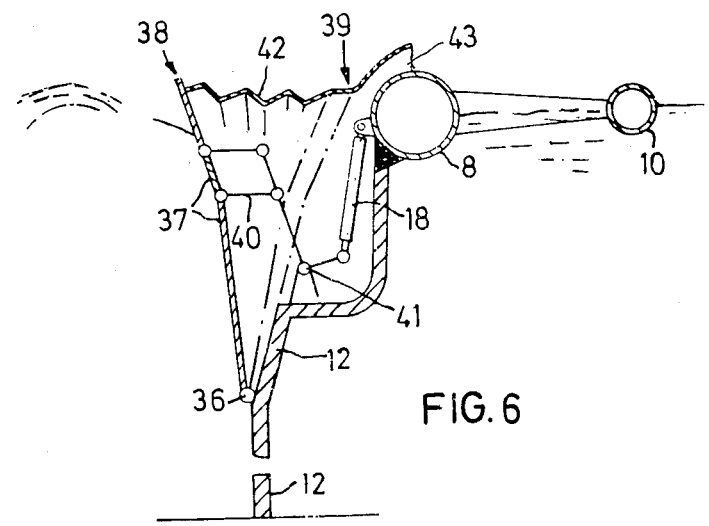

According to a special embodiment of the invention which is shown in FIG. 6, the swing member is made as a bellows which is compressed and expanded by the incoming waves. In the same manner as in the embodiment described previously, the device is born up by two displacement bodies 8,10, an attenuator 12 securely mounted thereon, and a swing member. The swing member is in this case mounted on the attenuator with its lower edge journalled at 36 on the attenuator 12. The swing member consists of a front movable plate 37 which swings within the area 38–39, and this movement is kinematically coupled via a linkage system 40 to the pump cylinder 18.

Pivot points 36 and 41 are fixed in the attenuator 12. The double-acting piston in the pump cylinder 18 is controlled in the same manner as in the system with the swing member 13 by the wave movement, the power transmission is the same, and the rotating machinery is placed in the displacement tube 8. Behind the plate 37, there is an air cavity formed by a bellows 42 between the plate 37 and the attenuator 12. The space communicates with the outside air via a channel 43 along the whole breadth of the bellows. The draft is adjusted with water ballast in the chamber.

What I claim is:

1. Wave power plant consisting of adjacently arranged basic units with anchoring means, with each basic unit comprising a member movable with the waves, a stationary member cooperating therewith, and a hydraulic-electrical system for converting the movements of the movable member relative to the stationary member into electrical energy, characterized in that the movable member consists of a displacement body whose front surface, facing the wave front, as it moves makes room for the mass of water which moves with a wave, and as it returns fills up the space freed as the water moves towards the wave, that the stationary member consists of displacement tubes rigidly joined to each other and with a substantially vertical plate which is sufficiently large and extends to sufficient depth to offer large resistance to movements in the water, and that journalling means are arranged for swingable attachment of the movable member to the stationary member.

2. Wave power plant according to claim 1, characterized in that the rear surface of the movable member is cylindrically curved around an axis of curvature coinciding with the journalling shaft on the stationary member.

3. Wave power plant according to claim 1, characterized in that the journalling means consists of at least one link of constant length and at least one length-adjustable link journalled vertically spaced from each other to the rear surface of the movable member and to the same shaft on the front surface of the stationary member, whereby the center of curvature of the surface can be brought into positions deviating from the pivot center.

4. Wave power plant according to claim 1, characterized in that the movable member is arranged above the stationary member and consists of a plate swingable between two positions around a journal shaft on the stationary member, the space between the plate and the stationary member being separated from the water with a bellows but open to the air through a channel, and that a linkage system is arranged as the plate moves to cause the hydraulic cylinder to pump oil to the hydraulic motor.

5. Wave power plant according to claim 1, characterized in that the hydraulic-electrical system comprises the double-acting hydraulic cylinder mounted between the stationary and movable members, a rotatable hydraulic motor with variable volume, coupled to an electrical generator, a hydraulic motor setter, connecting pipes and hoses and a control system.

6. Wave power plant according to claim 5, characterized in that the hydraulic cylinder is hydraulically symmetrical.

7. Wave power plant according to claim 5, characterized in that a flywheel is disposed on the electrical generator which is mechanically coupled to one or more hydraulic motors.

8. Wave power plant according to claim 1, characterized in that the control system is arranged to control the radian volume of the hydraulic motor, the electrical power output and the oscillations of the movable member dependent on the incoming waves, and comprises a process computer, a sensor in front of the movable member for the instantaneous water level, the hydraulic motor setter with an electrohydraulic servo valve, the flywheel, a tachometer generator for the rotational speed of the generator and sensors for forces on and the position of the movable member.

9. Wave power plant according to claim 1, characterized by one or more steering propellers for turning the wave power plant to the desired position in relation to the wave fronts.

* * * * *